United States Patent [19]

Cooper

[11] Patent Number: 5,030,411

[45] Date of Patent: Jul. 9, 1991

[54] REMOVAL OF IMPURITIES FROM COOLANT OF A NUCLEAR REACTOR

[75] Inventor: Martin H. Cooper, Churchill Boro, Pa.

[73] Assignee: Westinghouse Electric Corp., Pittsburgh, Pa.

[21] Appl. No.: 270,558

[22] Filed: Nov. 14, 1988

[51] Int. Cl.[5] .............................................. G21C 19/42
[52] U.S. Cl. ...................................... 376/312; 376/315
[58] Field of Search ....................... 376/312, 463, 315; 75/66; 62/55.5

[56] References Cited

U.S. PATENT DOCUMENTS

| | | | |
|---|---|---|---|
| 3,618,770 | 11/1971 | Pohl et al. | 210/85 |
| 3,693,959 | 9/1972 | Swinhoe et al. | 266/37 |
| 3,962,082 | 6/1976 | Hundal | 210/71 |
| 4,010,068 | 3/1977 | Cooper | 176/37 |
| 4,278,499 | 7/1981 | Abramson et al. | 176/37 |
| 4,488,964 | 12/1984 | Mitsutsuka | 210/182 |

Primary Examiner—Stephen J. Lechert, Jr.
Assistant Examiner—N. Bhat
Attorney, Agent, or Firm—Hymen Diamond

[57] ABSTRACT

The coolant is circulated thorugh the core of the reactor by a pump between a higher-pressure plenum and a lower-pressure plenum. The impurities are removed by a cold trap between the higher-pressure plenum and the lower-pressure plenum. The trap is an integrated unit including an inner tube and an outer tube defining between them an annulus which contains packing. The outer surface of the outer tube is cooled to a temperature such that the impurities are precipitated from the coolant. Since the packing is coldest on the outside, the precipitation progresses axially upstream to downstream and radially inwardly. The precipitation in the outer part of the annulus insulates the inner part of the annulus thermally so that the reduction of the temperature of the coolant to saturation level in the inner part is delayed precluding premature blocking of the cold trap. The cooled coolant in the annulus also precools the coolant flowing in through the inner tube.

5 Claims, 4 Drawing Sheets

POOL TYPE REACTOR

LOOP TYPE REACTOR

REMOVAL OF IMPURITIES FROM COOLANT OF A NUCLEAR REACTOR

BACKGROUND OF THE INVENTION

This invention relates to nuclear reactors and it has particular relationship to control and removal of the impurities which accumulate in the coolant of a nuclear reactor. This application deals specifically with nuclear reactors whose coolant is liquid metal, but the adaptation of this invention or its principles to reactors of other types or other coolants is regarded as within the scope of equivalents of this invention.

Typical of liquid metal reactors is the liquid-metal fast-breeder reactor (LMFBR) in which sodium is the coolant. Typically, in such reactors, the liquid metal is circulated through the core between a higher-pressure plenum from which "cold" sodium enters the core and a lower-pressure plenum into which the heated sodium passes from the core. The sodium in the higher-pressure plenum is at about 750° F. and the sodium in the lower-pressure plenum is at about 950° F. The operation takes place in a sealed pressure-tight vessel but oxides, hydroxides and other compounds are generated by the reaction of the highly reactive sodium predominantly with oxygen and hydrogen existing in the vessel as a result of corrosion, leakage and diffusion of air and water vapor, and with the absorbed oxygen and moisture on new equipment, such as the original fuel assemblies and fuel assemblies inserted in the core during refueling. In accordance with the teachings of the prior art, control of these impurities is accomplished by cold trapping. In this prior art practice, the sodium is processed separately by a so-called economizer and a cold trap which is called a crystallizer. The economizer is a tube having a cooling jacket through which sodium from the cold trap flows. The sodium from the reactor inlet (high pressure) is passed through the economizer and then through the cold trap, where it is cooled to a low temperature precipitating the impurities as their saturation temperatures are reached. Then this cooled sodium is passed through the jacket of the economizer where it precools the sodium which passes into the economizer and the sodium stream is reheated before discharge to the reactor outlet plenum (low pressure).

The above-described prior-art apparatus has a relatively short effective life and must be replaced during the life cycle of the reactor. Replacement of this apparatus is costly and requires shut-down of the reactor.

In lieu of the economizer and crystallizer, a so-called getter trap has been proposed. In a getter trap, the oxygen and hydrogen impurities are removed from the coolant by an iron-vanadium-zirconium alloy. This practice is costly because the iron-vanadium-zirconium alloy is costly.

It is an object of this invention to overcome the drawbacks of the prior art and to control and reduce the impurities in the coolant of a nuclear reactor at a reasonable cost and without repeated shut-down of the reactor.

SUMMARY OF THE INVENTION

Experimental studies have revealed that the prior-art economizer-crystallizer expedient uses up only about 20% of its available trapping volume and thereafter becomes ineffective. Based on these studies, it has been realized in arriving at this invention, that this prior art expedient loses its effectiveness because of local precipitation at the first region or plane of the cold trap, i.e., of the crystallizer where the liquid sodium solution becomes saturated and precipitates the oxides and hydroxides. This precipitation blocks the crystallizer so that the in-flow of coolant is substantially reduced or prevented and no appreciable further precipitation within the crystallizer can take place.

In accordance with this invention, a nuclear reactor is provided in which the control or removal of the solutes in the coolant is achieved by a cold trap in which the economizer is formed into an integrated unit with the crystallizer. In this new cold trap, the saturation temperature of the sodium solution is automatically adjusted as solids build up in the trap to utilize substantially the whole trap volume. Not only does this invention achieve substantially full use of the trap, but it also simplifies the structure of the apparatus by replacing the two separate components, the economizer and the crystallizer, by a single integrated cold trap.

In accordance with this invention, there is provided a nuclear reactor including a long-life cold trap which is an integral unit including an inner tube that may be called an "economizer", by analogy to the prior art, and an outer tube that may be called a "crystallizer" by the same analogy. The inner tube is open at both ends and is sealed to the outer tube near one of the ends extending from this end into the outer tube and opening into the outer tube near the end opposite the sealed end of the outer tube which may be described as the outlet end of the inner tube. The outer tube is closed at both ends. The inner tube and outer tube are typically circularly cylindrical and coaxial. They define between them an annulus which contains packing. Typically, the inner and outer tubes are composed of stainless steel. The packing is typically stainless steel mesh. The outer tube is provided with a cooling jacket through which cooled nitrogen gas is circulated.

The cold trap is mounted within the reactor vessel with the inner tube connected to the higher-pressure plenum at what may be described as its inlet end so that under this pressure, the coolant flows into the open inlet end of the inner tube. After reaching the opposite outlet end of the inner tube, the coolant turns and flows through the packing in the annulus. The coolant in the outer tube is cooled by cooled nitrogen gas flowing through the jacket in turn precooling the inlet coolant flowing through the inner tube. The temperature is lowest along the peripheral surface of the outer tube and along the outer surface of the packing. The coolant flows upstream to downstream through the packing; if the packing is vertical, the coolant is injected at the top of the packing and flows vertically downwardly. At the upstream end, the coolant is at a temperature above the saturation temperature at which the oxides and the hydroxides form precipitates. At a point below the upstream and downstream ends, the coolant at the outer surface of the packing reaches the saturation temperature, typically about 300° F. for sodium, and the impurities are precipitated along this outer surface. As the coolant continues to flow, the precipitated solid, acting as a thermal insulator, reduces the temperature decrease in the coolant in the region where the precipitation had started earlier. The precipitation then starts in a region further downstream along the flowing coolant. Precipitate is deposited on the packing axially downstream and radially inwardly from previously precipitated material. The precipitation thus progresses axially from upstream to downstream along the packing and radially inwardly from the periphery of the packing. As the precipitated solids layer progresses axially and radially inwardly, the heat conduction is reduced and the region at which the impurity saturates and therefore the precipitation occurs progresses upstream to downstream with respect to the flow of the coolant and radially inwardly. The cold trap integrated in the reactor, in accordance with this invention, self-compensates the thermal gradient as solids build up in the packing. The volume surrounding the inner tube is always at a higher temperature than the region of the annulus or packing nearer the cooling jacket. A coolant flow channel is then maintained in the region of the outer tube adjacent to or nearer the inner tube. This flow channel assures that premature blockage does not occur so that the volumetric capacity of the trap is effectively utilized.

BRIEF DESCRIPTION OF THE DRAWINGS

For a better understanding of this invention, both as to its organization and as to its method of operation, together with additional objects and advantages thereof, reference is made to the following description, taken in connection with accompanying drawings, in which.

DETAILED DESCRIPTION OF EMBODIMENT

Figure 6:
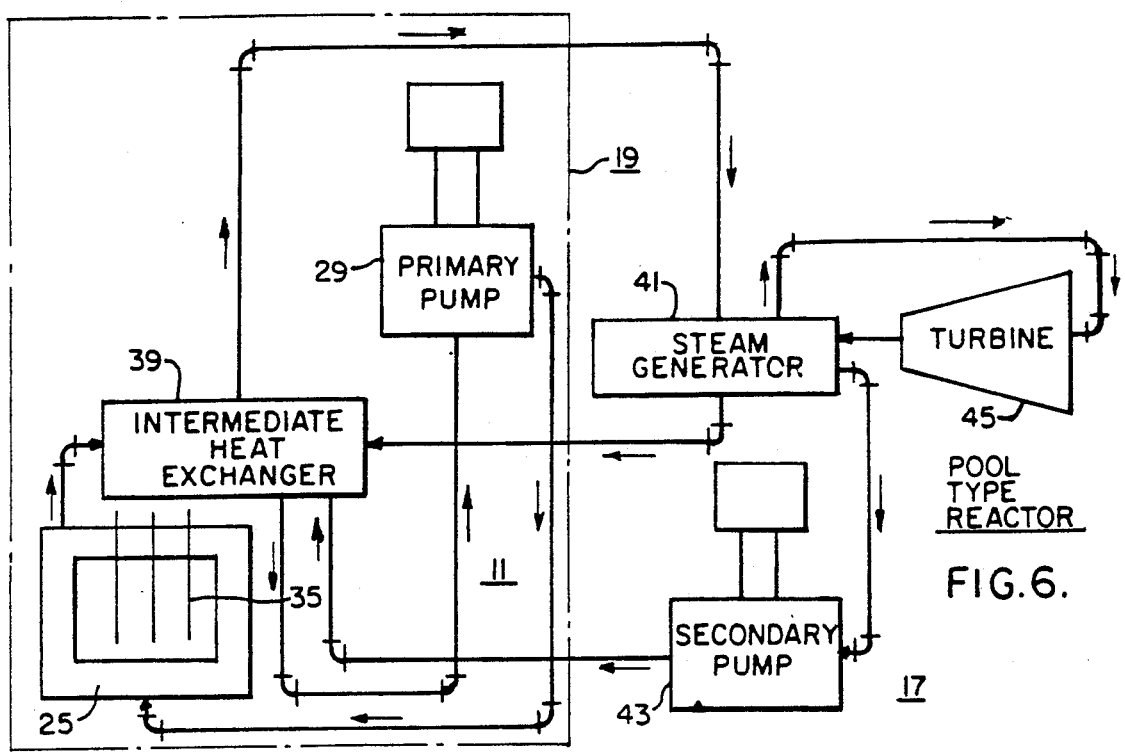
FIG. 6 is a flow schematic illustrating the operation of the nuclear reactor shown in FIGS. 1 and 2.
Figure 7:
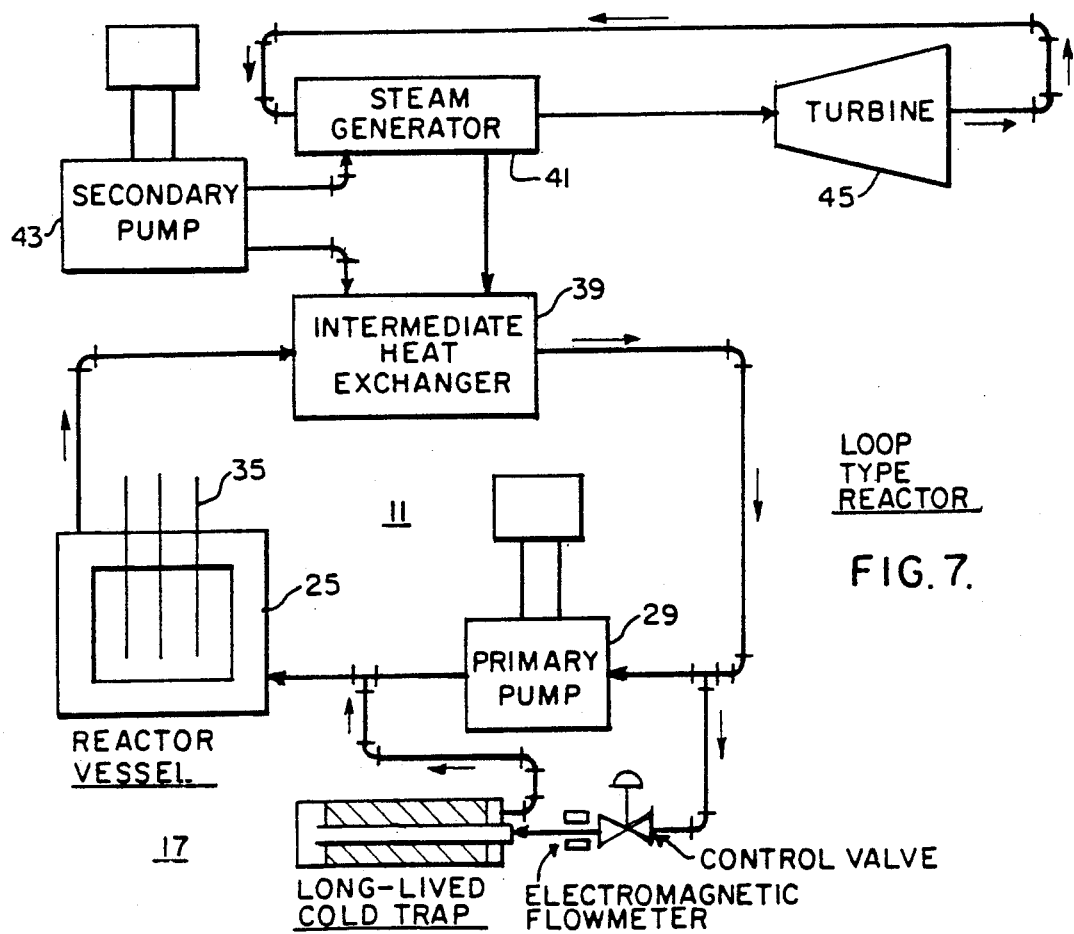
FIG. 7 is a schematic showing the coolant circuit of a reactor in accordance with this invention.

The drawings show a nuclear power plant 17 (FIGS. 6, 7) including a nuclear reactor 11 in accordance with this invention, typically a liquid-metal fast-breeder reactor in which liquid sodium is the coolant. The reactor 11 is installed in cavity 13 of a containment vessel 15. The containment 15 has a closure 16 from which a central dome 18 extends. The reactor 11 is the primary energy source of the nuclear power plant 17.

Figure 1:
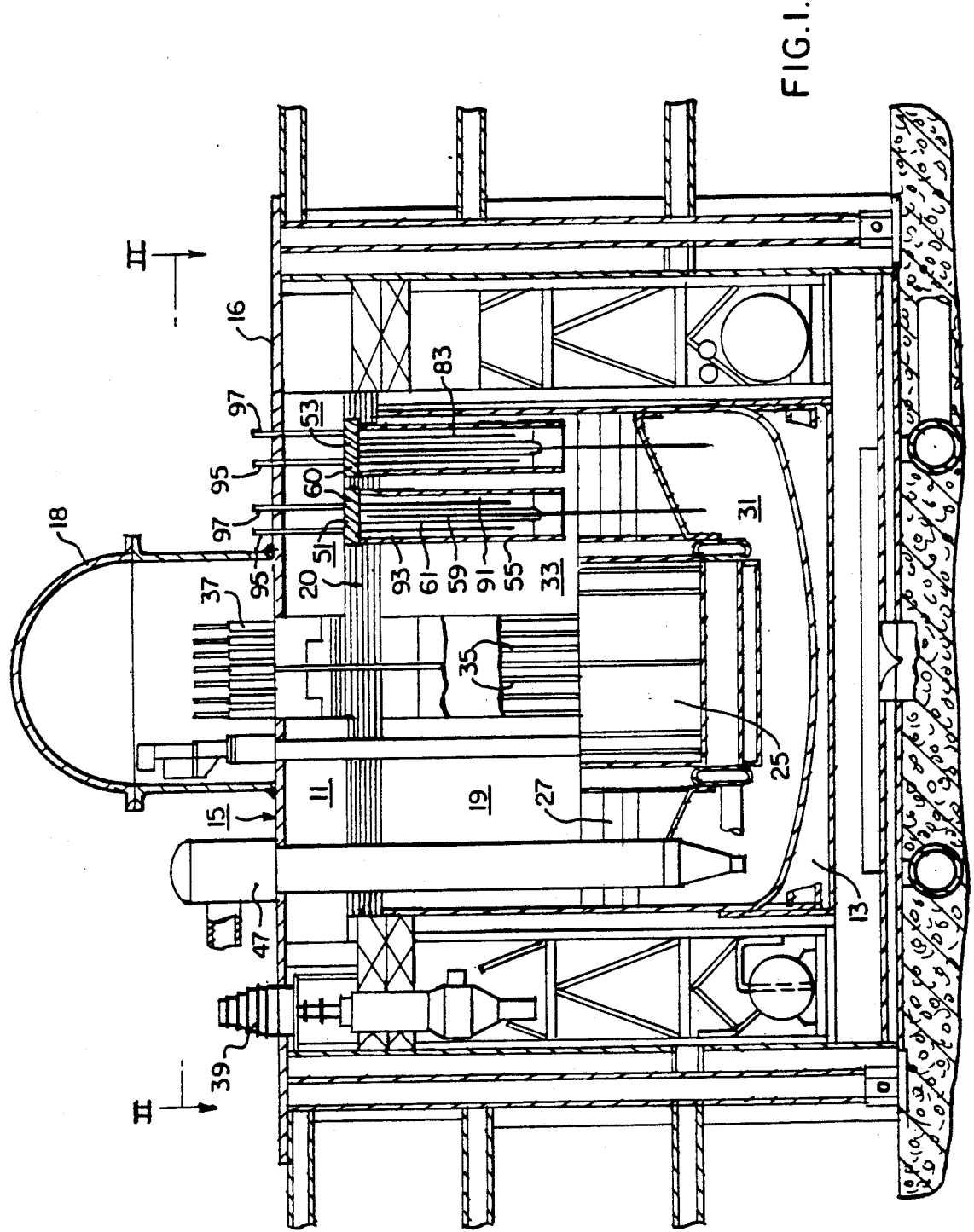
FIG. 1 is a view in longitudinal section showing the principle features of a nuclear reactor embodying this invention.
Figure 2:
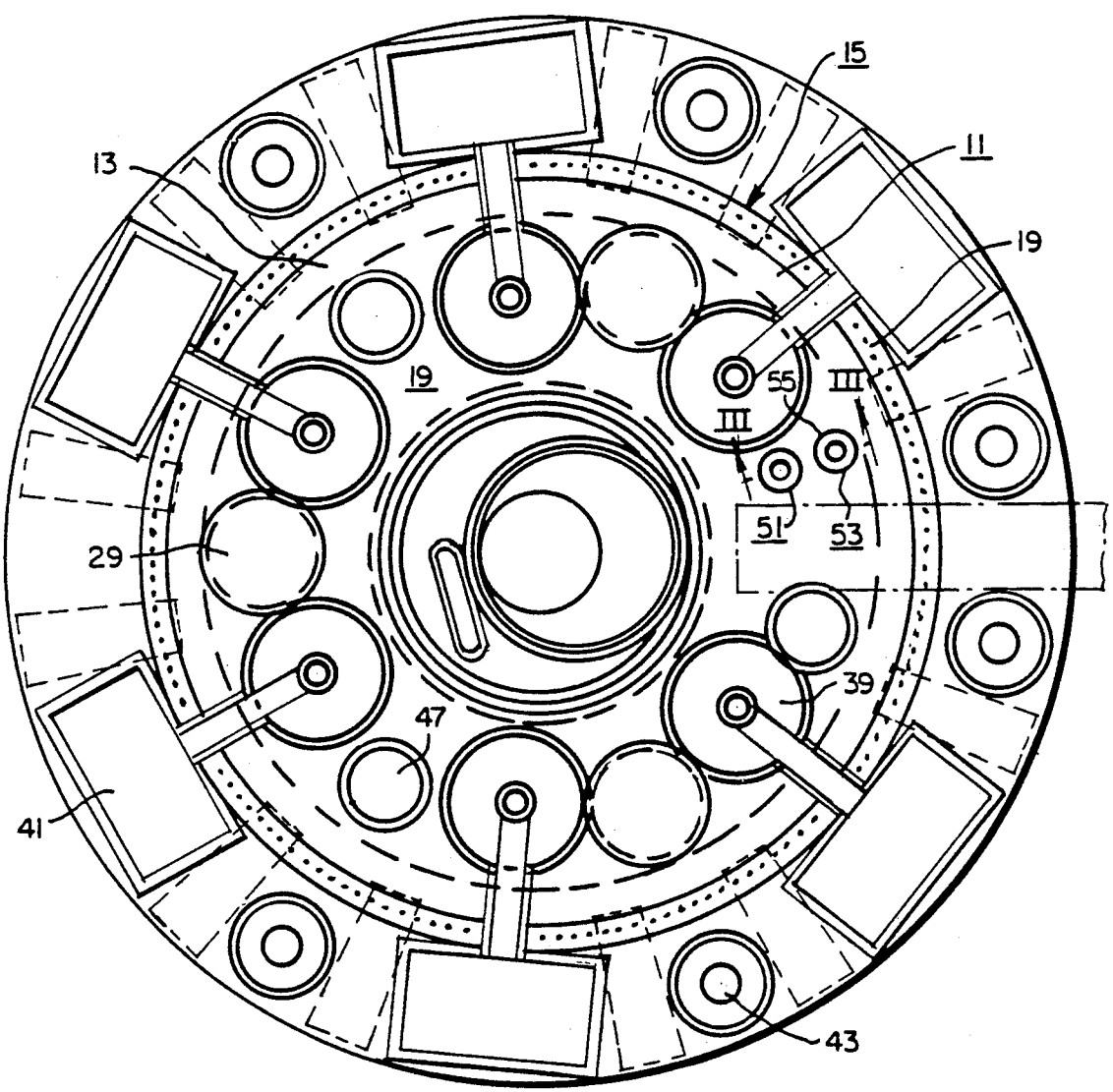
FIG. 2 is a plan view taken in the direction II—II of FIG. 1 with the dome-shaped cover removed.

The nuclear reactor 11 includes a vessel 19 having a roof 20 within containment vessel 15. Within the vessel 19, a core 25 is suspended from core support plates 27. The vessel contains a coolant which is circulated upwardly through the core 25 by a plurality of primary pumps 29 (FIG. 2) between a plenum 31 below the core and a plenum 33 above the core. The pumps are supported by the closure 16. The coolant in the lower plenum 31 is at higher pressure and a lower temperature than the coolant in plenum 33 above the core. The reactor includes control rods 35 movable into and out of the core 25 by control-rod drives 37 which extend into the dome 18. A plurality of intermediate heat exchangers 39 (FIG. 2) are supported by the closure 16. Typically, there are three primary pumps 29 and six intermediate heat exchangers 39. The pumps draw the higher temperature coolant from the core through the tube side, the primary, of each of the heat exchangers 39 (FIG. 2, 6). Each intermediate heat exchanger 39 transfers heat through liquid sodium on the shell or secondary side of the heat exchanger 39 to a steam generator 41 outside of the vessel 19. This secondary liquid sodium is driven by a secondary pump 43 (FIG. 2) connected in each loop downstream of the intermediate heat exchanger. The steam generators (FIGS. 2, 6) are connected to drive a turbine 45. A plurality, typically three, direct reactor auxiliary cooling systems (DRACS) 47 are suspended from the closure 16 to remove the heat generated by fission product decay in the core after the reactor shutdown.

Figure 3:
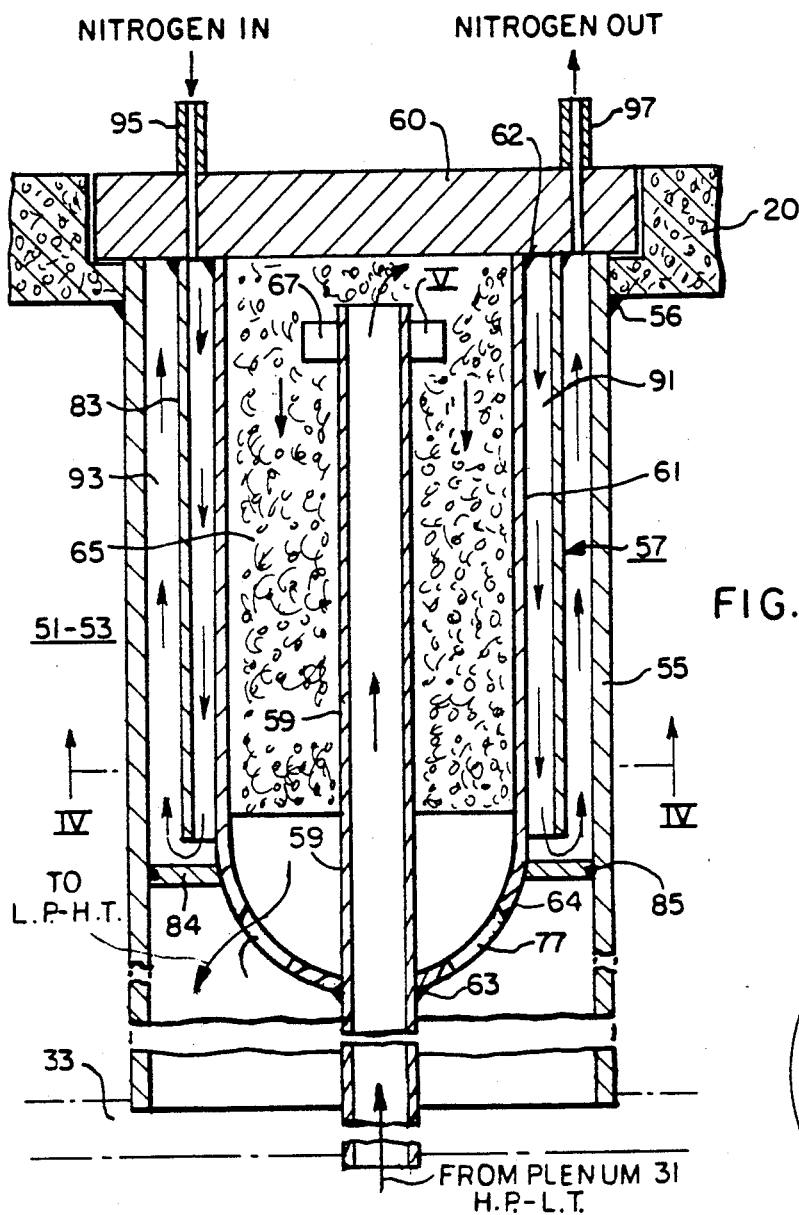
FIG. 3 is a fragmental view in longitudinal section enlarged, taken along line III—III of FIG. 2 showing in detail the long-lived integrated cold trap in the embodiment shown in FIG. 1.
Figure 5:
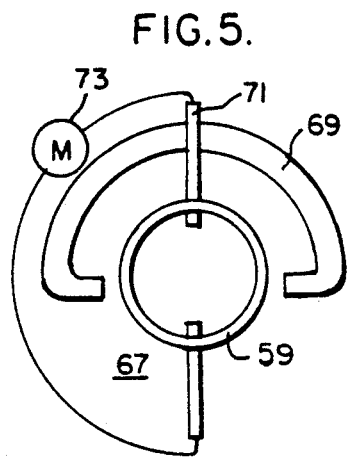
FIG. 5 is a fragmental diagrammatic view enlarged showing the flow meter identified by the rectangles V in FIG. 3.
Figure 4:
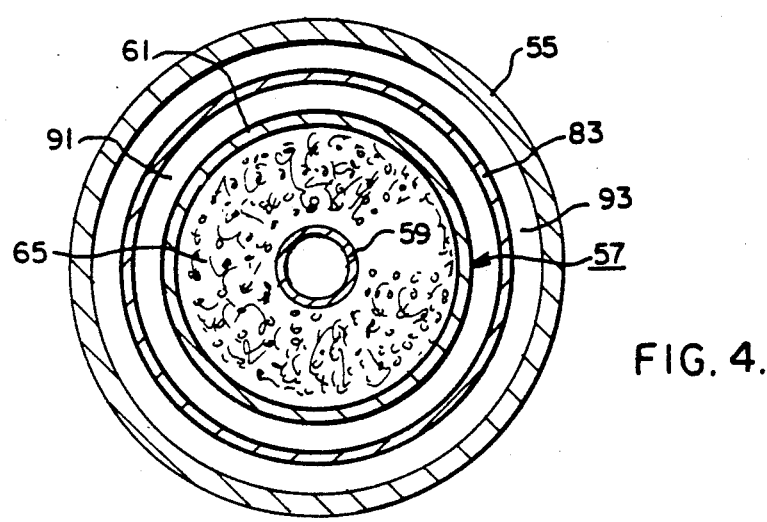
FIG. 4 is a view in transverse section taken along line IV—IV of FIG. 3.

In accordance with this invention, the reactor 11 is provided with long-life cold trap assemblies 51 and 53. Each assembly includes a standpipe 55 (FIG. 3) which is secured to the roof 20 of the vessel 19 by a fillet weld 56. The standpipe 55 extends between a mounting and shielding plug 60 for the cold trap 51–53 and the higher-temperature lower-pressure plenum 33. The plug 60 is disposed in a slot in the roof 20. A long-life cold trap 57 (FIGS. 3, 4) is in accordance with this invention, suspended from plug 60 within each standpipe 55. Each cold trap 57 includes an inner tube 59 and an outer tube 61. The outer tube 61 is joined by weld 62 to plug 60. The outer tube 61 has a generally spherical base 64 which is secured to the inner tube 59 by a ring weld 63. The inner and outer tubes typically may be composed of stainless steel. The inner and outer tubes define between them an annulus in which packing 65 consisting of stainless-steel wire mesh is installed. At its upper end (with reference to FIG. 3), the inner tube 59 opens into the annulus. Near its upper end, the inner tube is provided with an electromagnetic flow meter 67 (FIG. 5). The flow meter includes a permanent magnet 69 (FIG. 5) whose poles face diametrically opposite surfaces of the upper end of the inner tube 59. Electrodes 71 penetrate through the tube 59 at diametral points along a direction at right angles to the direction between the poles. The flow is measured by a meter 73 connected to the electrodes. The stainless steel which forms tube 59 should be of non-magnetic type. Near its lower end the outer tube 61 has holes 77 which open into the interior of the standpipe 55. A baffle ring 83 is suspended from the plug 60 between the outer tube 61 and the standpipe 55.

The cold trap 57 is constructed as a unit and mounted within the standpipe 55. An annular plate 84 secured to the outer tube is connected to the inner surface of the standpipe through a piston ring 85. The inner tube 59 is connected to, and opens into, the higher-pressure plenum 31 so that the coolant is driven through this tube into the packing 65. The coolant which flows through the packing is discharged into the lower-pressure plenum 33 through the standpipe 55.

The baffle ring 83 defines an inner annulus 91 between the outer tube 61 and the baffle ring and an outer annulus 93 between the baffle ring and the standpipe. The baffle ring 83 terminates above the plate 84 so that the annuli 91 and 93 are connected. The annuli 91 and 93 form a cooling jacket for the outer tube 61. Precooled nitrogen gas is injected into the annulus 91 through conductor 95 and is circulated through the gap between the lower end of the baffle ring 83 and the plate 84 along the annulus 91, cooling the outer regions of tube 61, through annulus 93 and out through conductor 97.

Typically, the length of the outer tube 61 of the cold trap 57 is 238 inches and inside diameter is 65.6 inches. The diameter of the cold trap including both annuli 91 and 93 is 66.4 inches. The inner tube 59 is a 4-inch SCH 40 pipe. The holes 77 may be provided with 2-inch SCH 40 pipe (not shown). The inner tube 59 should be long enough to extend into the higher-pressure plenum 31. Alternatively, the cold trap 57 may be constructed with a relatively short inner tube 59 and an extension may be welded to its end during installation.

In the operation of a nuclear reactor embodying this invention, the pressure in the higher-pressure plenum drives the coolant through inner tube 59 and through the open upper end of this tube into and through the packing 65. The coolant is discharged through holes 77 into the lower-pressure plenum 33. The outer surface of the outer tube 61 and through it the outer region of the packing and the coolant flowing through it are cooled by the nitrogen flowing through annulus 91. The coolant enters the packing 65 at the top at a temperature of about 750° F. and as it flows downwardly, it is cooled, the greatest decrease in temperature taking place in the coolant along the outer periphery of the packing 65. The coolant initially reaches the saturation temperature of about 300° F. for the oxides and hydroxide solutes at a region along the packing intermediate the upper and discharge ends. For purposes of this explanation, it may be assumed that in the peripheral region of the coolant, the saturation temperature is first reached in a region six feet from the top. Beginning in this region and continuing downwardly, the solutes are precipitated along the outer periphery of the packing 65. As the flow continues, the precipitated layer acts as a thermal insulator reducing the radially inward temperature decrease. The coolant immediately adjacent the precipitation at the six-feet downward region is then no longer reduced to the saturation temperature; the saturation temperature is reached at a lower region. The precipitation thus continues to take place progressively axially downwardly and radially inwardly. The cold trap is not blocked and continues to conduct the coolant. The coolant flowing through the packing 65, whose temperature is reduced, precools the coolant flowing in through inner tube 59.

The life of reactor 11 is about 30 years. It is estimated that the cold trap 57 will operate effectively for about 13 years. To cover the 30-year life of the reactor, the two cold-trap assemblies 51 and 53 are installed during assembly of the reactor. Initially, the cooling nitrogen gas is supplied only to one of the cold-trap assemblies, for example 51. After about 13 years, the supply of cooling nitrogen to assembly 51 will be terminated and the cooling gas will be supplied to the cold-trap assembly 53. This assembly has a longer life of about 17 years since, when it is set into operation, the oxygen and moisture originally contaminating the reactor components will have been removed by the cold-trap assembly 51 which operates over the first 13 years.

While an embodiment of this invention has been disclosed herein, many modifications thereof are feasible. This invention is not to be restricted except insofar as is necessitated by the spirit of the prior art.

I claim:

1. In a nuclear reactor having a core and a fluid circuit including means for circulating a coolant through said core, said fluid circuit including a main branch and an auxiliary branch connected to said main branch to conduct continuously a fraction of the coolant conducted through said main branch for removing impurities dissolved in said coolant; a cold trap including:
   (a) an annular member having an inner boundary and an outer boundary,
   (b) packing interposed between said inner boundary and said outer boundary,
   (c) means, connecting said inner boundary to said auxiliary branch, to conduct the coolant from said auxiliary branch in succession through said inner boundary then through said packing; the said cold trap also including means for cooling said outer boundary to cool the coolant in said packing, progressively radially inwardly thereby to precipitate said impurities in said coolant progressively axially in the direction from upstream to downstream of the coolant flow in said packing and progressively radially inwardly thereby reducing the heat conduction through said packing progressively in the direction from upstream to downstream of the coolant flow through said packing and progressively radially inwardly; the transverse dimension of the annulus of said annular member being of substantially magnitude whereby the axial flow of coolant through said annulus is not substantially impeded by radial build-up of precipitated impurities for a long interval of time; and means, connecting said outer boundary to said main branch, to discharge the coolant which has passed through said packing into said main branch.

2. A nuclear reactor including a core and means for circulating a coolant through said core between a first plenum downstream of said core with respect to the flow of said coolant, in which plenum said coolant is at a higher pressure, and a second plenum upstream of said core with respect to the flow of said coolant, in which second plenum said coolant is at a lower pressure; said reactor also including at least one cold trap for removing impurities from said coolant, said cold trap having:
   (a) an inner tube,
   (b) an outer tube encircling said inner tube defining an annulus between said inner tube and said outer tube,
   (c) packing in said annulus, and
   (d) means connected to said outer tube, for cooling the outer surface of said outer tube; said reactor also including means, connecting said inner tube to said second plenum, to conduct the coolant in succession through said inner tube and then through said packing whereby said coolant is cooled in said packing precipitating said impurities progressively in a direction from upstream to downstream with respect to the flow of said coolant through said packing and progressively radially inwardly of said coolant, whereby the heat conduction through said packing is reduced progressively in a direction from upstream to downstream with respect to the flow of said coolant and progressively radially inwardly; the transverse dimension of said annulus being of substantial magnitude whereby the axial flow of coolant through said annulus is not substantially impeded by radial build-up of precipitated impurities over a long interval of time, and means, connecting said outer tube in a region downstream with respect to flow of said coolant through said packing to said first plenum, to discharge purified coolant into said first plenum.

3. In a nuclear reactor having a core and a fluid circuit including means for circulating a coolant through said core, said fluid circuit including a main branch and an auxiliary branch connected to said main branch to conduct continuously a fraction of the coolant conducted through said main branch for removing impurities dissolved in said coolant; a cold trap including:

(a) an annular member having a laterally closed inner boundary and an outer boundary, said outer boundary being sealed to said inner boundary near one end of said outer boundary and said inner boundary being open to said outer boundary at the end remote from the seal between said outer and inner boundaries, (b) packing interposed in the annulus between said inner boundary and said outer boundary, (c) means, connecting said inner boundary to said auxiliary branch, to conduct the coolant from said inner auxiliary branch in succession through said inner boundary then through said remote end and through said packing progressively from said remote end of said inner boundary;

the said cold trap also including means for cooling said outer boundary to cool the coolant in said packing progressively radially inwardly thereby to precipitate said impurities in said coolant progressively radially inwardly and axially progressively in the direction from upstream to downstream of the coolant flow in said packing and progressively radially inwardly thereby reducing the heat conduction through said packing progressively in the direction from upstream to downstream of the coolant flow through said packing and progressively radially inwardly; and means, connecting said outer boundary to said main branch to discharge the coolant which has passed through said packing into said main branch.

4. A nuclear reactor including a core and means for circulating a coolant through said core between a first plenum downstream of said core with respect to the flow of said coolant, in which plenum said coolant is at a higher pressure, and a second plenum upstream of said coolant flow, in which second plenum said coolant is at a lower pressure; said reactor also including at least one cold trap for removing impurities from said coolant, said coolant, said cold trap having:

(a) a laterally closed inner tube, (b) an outer tube encircling said inner tube defining an annulus between said inner tube and said outer tube, (c) means sealing said outer tube to said inner tube near one end of said outer tube, said inner tube being open into said annulus at the end remote from the seal of said outer tube to said inner tube, (d) packing in said annulus, and (e) means, connected to said outer tube, for cooling the outer surface of said outer tube;

said reactor also including means, connecting said inner tube to said second plenum, to conduct the coolant in progressively succession through said inner tube and then through said packing progressively from the remote end of said inner tube in the direction toward said one end, whereby said coolant is cooled in said packing precipitating said impurities progressively in a direction from upstream to downstream with respect to the flow of said coolant through said packing and progressively inwardly of said coolant, whereby the heat conduction through said packing is reduced progressively in a direction from upstream to downstream with respect to the flow of said coolant and progressively radially inwardly; and means, connecting said outer tube in a region downstream with respect to the flow of said coolant through said packing to said first plenum, to discharge purified coolant into said first plenum.

5. The nuclear reactor of claim 4 characterized by that the coolant conducting means in connected directly to the second plenum to conduct the coolant through said inner tube under the pressure differential between the second plenum and the first plenum.

* * * * *